US008301176B1

(12) United States Patent
Yellin et al.

(10) Patent No.: US 8,301,176 B1
(45) Date of Patent: Oct. 30, 2012

(54) INCREASING THE STAND-BY TIME OF WIRELESS DEVICES

(75) Inventors: Daniel Yellin, Ra'anana (IL); Yona Perets, Ra'anana (IL)

(73) Assignee: Marvell International Ltd., Hamilton (BM)

(*) Notice: Subject to any disclaimer, the term of this patent is extended or adjusted under 35 U.S.C. 154(b) by 906 days.

(21) Appl. No.: 12/116,589

(22) Filed: May 7, 2008

Related U.S. Application Data

(60) Provisional application No. 60/916,431, filed on May 7, 2007, provisional application No. 60/916,926, filed on May 9, 2007, provisional application No. 60/952,779, filed on Jul. 30, 2007.

(51) Int. Cl.
*H04W 68/001* (2006.01)

(52) U.S. Cl. ........................................ 455/458; 455/574

(58) Field of Classification Search .................. 455/458, 455/574, 127.5
See application file for complete search history.

(56) References Cited

U.S. PATENT DOCUMENTS

| | | | |
|---|---|---|---|
| 6,243,561 B1* | 6/2001 | Butler et al. | 340/7.42 |
| 6,560,453 B1* | 5/2003 | Henry et al. | 455/67.11 |
| 6,889,055 B1* | 5/2005 | Neufeld | 455/458 |
| 7,047,050 B1* | 5/2006 | Khawand et al. | 455/574 |
| 7,209,728 B2* | 4/2007 | Ogura | 455/343.1 |
| 7,463,599 B2* | 12/2008 | Lindoff et al. | 370/311 |
| 7,680,071 B2* | 3/2010 | Bultan et al. | 370/311 |
| 2006/0285485 A1* | 12/2006 | Agrawal et al. | 370/208 |
| 2008/0014969 A1* | 1/2008 | Laroia et al. | 455/458 |

* cited by examiner

*Primary Examiner* — Jean Gelin
*Assistant Examiner* — Michael S Bush

(57) ABSTRACT

The present disclosure describes a wireless user equipment (UE) device that can receive a communication signal that may be transmitted along a wireless channel. The wireless user equipment device can include a sleep deactivator that periodically activates wireless user equipment from a sleep mode periodically in advance of a periodically transmitted message, such as a paging indicator or a control message that is expected to be received within a slot of time. The wireless user equipment device can also include an element that can extract the message during multiple sub-intervals, a signal quality assessor that can a) assess the quality of the indicator in the sub-intervals and b) assign a signal quality metric for the sub-intervals. The wireless UE device can also include a channel estimator that can estimate a physical channel over which the communication signal is transmitted. The wireless UE device can also assign a quality metric to the extracted message at each sub-interval to select a sub-interval that is most consistent with timing of the paging indicator or control message.

49 Claims, 5 Drawing Sheets

INCREASING THE STAND-BY TIME OF WIRELESS DEVICES

INCORPORATION BY REFERENCE

This application claims the benefit of U.S. Provisional Application No. 60/916,431, "Increasing Stand-by Time in OFDM Handsets" filed on May 7, 2007, No. 60/916,926, "Increasing Stand-by Time in OFDM Handsets" filed on May 9, 2007, and No. 60/952,779, "Increasing Stand-by Time in OFDM Handsets" filed on Jul. 30, 2007 including all cited references which are incorporated herein by reference in their entirety.

BACKGROUND

A cellular handset or user equipment (UE) is a battery-powered wireless device that communicates with one or more base stations (BSs), such as an eNodeB. A cellular handset can be in one of two modes, an idle or a connected mode. In the idle mode, the UE can operate in a discontinuous reception (DRX) mode. In accordance with some standards governing cellular handset operation, in the connected mode, the UE can operate in a continuous reception mode or DRX mode. During the DRX mode, the handset can enter a sleep mode and can wakeup to detect periodic control messages. When a cellular handset or UE enters the sleep mode, the UE can conserve the energy stored in the battery and extend the standby and connect time of a cellular handset.

A cellular handset may periodically awaken or exit the sleep mode to test for a paging indicator or control message from a base station. The indicator or message can show that a message from a base station is available for the cellular handset. The cellular handset may make brief, repeated transitions from the sleep mode to an active or connect mode, and vice versa, when checking for messages. The cycle of sleep and connect mode transitions can be called standby mode.

A cellular handset consumes a relatively small amount of power during the sleep mode. When a cellular handset exits the sleep mode, the increased power consumption shortens the remaining standby and connect time.

SUMMARY

The present disclosure describes a wireless user equipment (UE) device that can receive a communication signal that may be transmitted along a wireless channel. The wireless user equipment device can include a sleep deactivator that periodically activates the wireless user equipment device from a sleep mode periodically in advance of a periodically transmitted message, such as a paging indicator or a control message that is expected to be received within a slot of time. The wireless user equipment device can also include an element that can extract the message during multiple sub-intervals, a signal quality assessor that can a) assess the quality of the indicator in the sub-intervals and b) assign a signal quality metric for the sub-intervals. The wireless UE device can also include a channel estimator that can estimate a physical channel over which the communication signal is transmitted. The wireless UE device can also assign a quality metric to the extracted message at each sub-interval to select a sub-interval that is most consistent with timing of the paging indicator or control message.

The present disclosure describes a wireless device that can include a receiver that receives and samples a transmitter signal that has a periodically transmitted message such as a paging indicator or a control message, a sample selector unit that selects signals at multiple delays, a hypothesis testing unit that uses a predetermined criterion to demodulate and score the samples of the received signal at the multiple delays, and a controller that determines the message timing based on the scores.

The present disclosure describes a wireless device that can include a receiver that samples a periodically transmitted message such as a paging indicator or a discontinuous reception (DRX) control message, a sample demodulation unit that demodulates the received samples at multiple delays and forms a corresponding set of delayed sampled received signals, a hypothesis testing unit that scores the offset received signal samples using a predetermined scoring criterion, and a controller that determines the present symbol timing based on the present scores.

This disclosure can provide a method of determining the symbol timing of a periodically transmitted orthogonal frequency division multiple access signal. The disclosed method can include 1) sampling a transmitter signal that has a paging indicator or DRX connected mode control message, 2) providing a set of delayed samples of the received signals, 3) demodulating selected sets of delayed samples, 4) scoring each set using a predetermined scoring criterion, and 5) selecting the symbol timing based on the delay that corresponds to the maximum or selected score.

BRIEF DESCRIPTION OF THE DRAWINGS

The disclosure will make reference to the accompanying figures, wherein like numerals represent like elements, and wherein.

DETAILED DESCRIPTION OF EMBODIMENTS

Figure 1A:
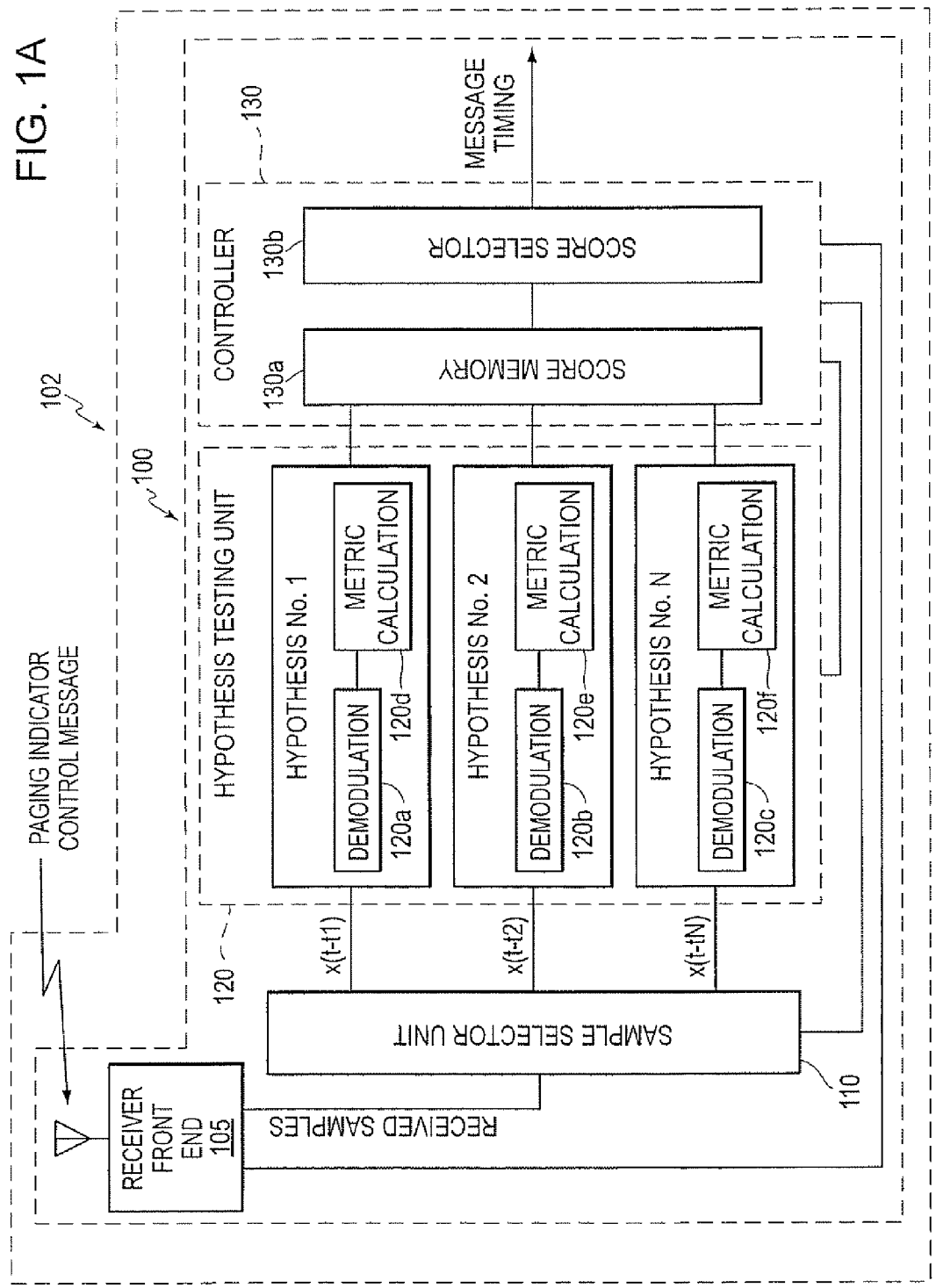
FIG. 1A shows a diagram of an example of a message timing determination unit in a wireless device in accordance with an embodiment.

FIG. 1A shows a diagram of a message timing determination unit 100 which is part of a wireless device schematically represented by reference numeral 102. In accordance with an embodiment, message timing determination unit 100 includes a receiver front end 105, a sample selector unit 110, a hypothesis testing unit 120, a controller 130, and a channel estimator 140. In accordance with an embodiment, wireless device 102 may be a mobile user equipment (UE) that is compatible with third generation partnership program (3GPP) standards, such as a long term evolution (LTE) mobile UE. In accordance with an embodiment, timing determination unit 100 can test the timing hypotheses of received paging indicators or other suitable messages that are transmitted with several frequency components and determine a timing of when the indicator or message was received.

The receiver front end 105 can receive a radio frequency (RF) communication signal and can couple samples of the received signal to the sample selector unit 110. The sample selector unit 110 can couple the signal samples to the hypothesis testing unit 120. The hypothesis testing unit 120 can couple hypothesis results and decoded signals to the controller 130. The controller 130 can couple control signals, clock signals, and demodulation parameters, including signal structure and channel estimations or propagation path parameters, to the hypothesis testing unit 120, the sample selector unit 110, and the receiver front end 105.

The receiver front end 105 can receive a radio frequency (RF) transmitter signal, such as a WiMax signal, a long term evolution (LTE) signal, such as an LTE advance signal, or a frequency division multiplex (FDM) signal, such as an orthogonal frequency domain multiple access signal, denoted OFDM or OFDMA, from a base station or a Node B. The RF transmitter signal can include a paging signal, a paging channel, a paging indicator, such as an enhanced universal terrestrial radio (E-UTRA) paging indicator or a third generation partnership program (3GPP) long term evolution (LTE) paging indicator, a reference signal (RS), a periodic control message transmitted on a control channel during a DRX transmission in a connected mode, and other signals. The receiver front end 105 can receive the RF signal on one or more antennas and can downconvert the RF signal to an intermediate frequency (IF) or a baseband received signal.

The receiver front end 105 can include mixers, local oscillators, filters, amplifiers, and other elements that downconvert RF signals to an IF or baseband received signal. Some of the analog, RF, and digital elements of receiver front end 105 may be de-powerable upon receipt of a sleep mode command from controller 130.

The receiver front end 105 may include one or more analog to digital converters (ADC) that sample the received signal or convert the analog IF or complex baseband signal to a real or complex digital data stream. The receiver front end 105 can combine downconversion and sampling. For example, the receiver front end 105 can use subsampling or intentionally aliasing to fold a subsampled IF signal to generate a sampled baseband signal. The signal samples or digital stream can be coupled via a serial digital bus, a parallel digital bus, and the like, to the sample selector unit 110.

The elements of receiver front end 105 can be configured by control signals from controller 130. The controller 130 may include a sleep deactivator functionality that can activate other elements of the wireless device 102, including the receiver front end 105. For example, the controller 130 may exit a sleep mode at a wake-up time or pre-frame time, and may apply power to analog and/or digital sections of the receiver front end 105 before an impending paging signal. The controller 130 may adjust receiver front end 105 elements such as the bandwidth of filters, the frequency of local oscillators, the gain of amplifiers, and the like. For example, the controller 130 can supply a sample clock signal to the receiver front end 105 that can determine the sampling rate and sample-timing phase of an ADC.

The sample selector unit 110 can store samples of the received signal and can transfer stored samples in a serial or parallel form to the hypothesis testing unit 120. The sampled received signal can be arranged in multiple blocks or intervals. The intervals may be offset in time and partially overlap or abut each other, or may be non-overlapping with gaps. In one embodiment, the intervals abut each other. For example, sample selector unit 110 can distribute or de-multiplex stored samples in blocks. Each block of samples or intervals can represent a different hypothesized time slot in which a paging indicator or control message is received. For example, the designated indicator or message can be one or more OFDM symbols, which can be temporally overlapping or non-overlapping samples. In an embodiment, each block can include $2^k$ sequential samples of the received signal, where k is a positive integer.

The hypothesis testing unit 120 can include a demodulation functionality 120a, 120b, and 120c and corresponding metric calculation functionality 120d, 120e, and 120f. The demodulation functionality 120a-c can demodulate the sampled received signals that may be plural frequency components and may apply the channel coefficients and equalization parameters to the sampled received signals. In other words, the demodulation functionality 120a-c may perform both FFT-based signal separation as well as equalization functions. For example, the demodulation functionality 120a-c can include equalization by adjusting multiplier coefficients, such as equalization and channel coefficients using a multiplication stage that precedes or follows a conventional set of FFT stages. It may be noted that the sample received signals may be processed serially or in parallel.

Figure 1B:
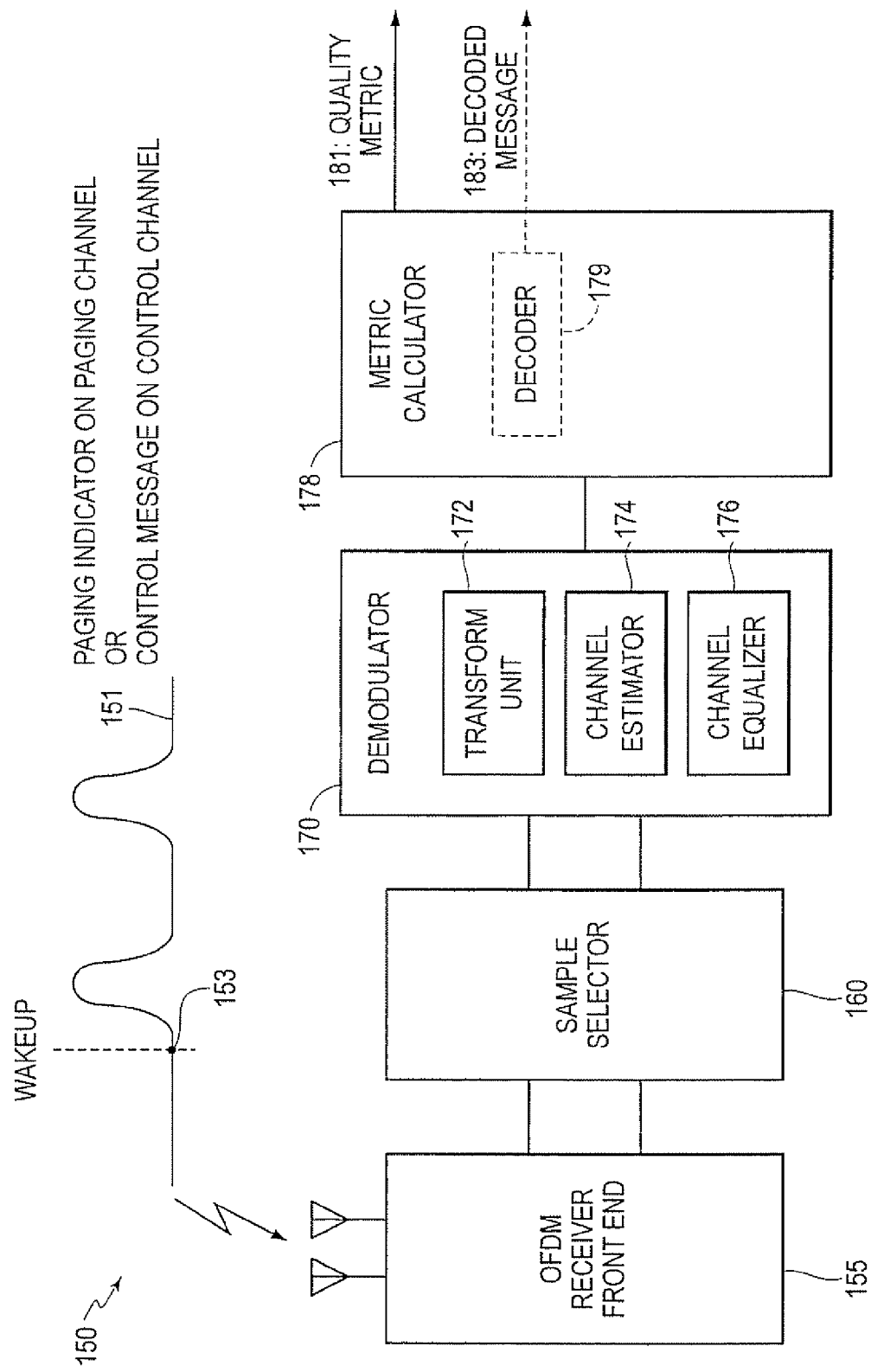
FIG. 1B shows a block diagram of a hardware implementation of the message timing determination unit of FIG. 1A.

FIG. 1B shows a block diagram of a hardware implementation 150 of the message timing determination unit 100 of FIG. 1A in accordance with an embodiment. The elements and structure of the hardware implementation 150 will be discussed in detail to convey an embodiment that can allow serial sample processing, then the discussion will resume with the structure and function of the message timing determination unit 100.

The hardware implementation 150 can receive an RF signal 151 at an orthogonal frequency division multiplex (OFDM) receiver front end 155. The RF signal 151 can bear a paging indicator on a paging channel or a control message on a control channel. The hardware implementation 152 may wake up at a wake up time 153.

The receiver front end 155 can receive the RF signal 151 at one or more antennas, downconvert, and sample the downconverted signals, and transfer the downconverted signals to the sample selector 160. The sample selector 160 can select samples to be demodulated by the demodulator 170. The demodulator 170 can include a transform unit 172, a channel estimator 174, and a channel equalizer 176 for example. The demodulator 170 may be a single block that demodulates each selected sample cyclically or there may be several demodulator blocks, each of which can demodulated a different sample corresponding to a timing hypothesis as discussed with respect to FIG. 1A. In other words, the demodulator 170 may operate serially upon samples to demodulate all of the sampled OFDM signal or in parallel, as shown with respect to demodulation functionality 120a-c of FIG. 1A.

The transform unit 172 can be a fast Fourier transform (FFT) unit. The channel estimator 174 can be an estimator that determines channel propagation parameters and other signal parameters. The channel equalizer 176 can compensate the output of the transform unit 172 so that the RF signal 151 is equalized in the sense of Nyquist. For example, the channel equalizer 176 may accept channel propagation parameters from the channel estimator 174 and may process the output of the transform unit 172 to generate a demodulated, equalized output signal that exhibits minimal inter-symbol interference.

The demodulator 170 can transfer the demodulated, equalized signals corresponding to multiple timing hypotheses to the metric calculator 178. The metric calculator 178 can determine a quality metric 181 for each timing hypothesis. The metric calculator 178 may include a decoder 179, such as a Viterbi decoder, a low density parity check (LDPC) decoder, and the like that can decode a message that includes forward error correction (FEC). The decoder 179 may be optionally, and if included, can output a decoded message 183.

As discussed, the hardware implementation 150 may be controlled by a controller (not shown) such as the controller 130 discussed with respect to FIG. 1A. The controller may serially process samples, such as sample blocks corresponding to a given timing hypothesis for the time of arrival of the RF signal 151 with respect to a wake up time 153. The functionality of hardware implementation 150 may be understood equally well in terms of a parallel arrangement of timing hypotheses per the following resumed discussion of FIG. 1A.

The metric calculation functionality 120d-120f of FIG. 1A can decode the demodulated, equalized signal and can compute a signal quality metric or score that is based on predetermined criteria. For example, the metric calculation functionality 120d-f can perform decoding functions, such as log-likelihood ratio (LLR) calculations, Viterbi decoding, cyclic redundancy check (CRC) calculations, and the like. For example, the metric calculation functionality 120d-120f can use the decoded signal to compute a channel quality indicator CQI or other signal quality score.

The demodulation functionality 120a, 120b, and 120c can apply Fourier transforms, chirp-Z transforms, filter-bank result vectors, and the like, that segregate each of the following into time-frequency bins: 1) modulated signal components, 2) un-modulated signals, tones or pilot signals, and 3) noise components. The demodulation functionality 120a-c may or may not track frequency shifts in carrier or sub-carrier frequencies of the RF signal.

Scores output by the hypothesis testing unit 120 can be used to determine the approximate time-of-arrival (TOA) of a paging signal. The exactness of the estimate or approximation can depend on the range or window of hypothesized arrival times of a designated symbol in a paging signal.

Each demodulation functionality 120a-120c can demodulate a signal, such as an OFDMA signal, by calculating Fourier transforms of blocks of samples. The demodulation functionality 120a-120c may be described as extractive elements that can extract a symbol from the communications signal. The demodulation functionality 120a-120c may use circular convolution, eigen decomposition, cyclic prefix padding, periodic sampling, overlap-add techniques, overlap-save techniques, windowing, and the like. For example, the demodulation functionality 120a-120c can decompose or demodulate an OFDMA signal having data padding that may be described as a cyclic prefix into separate frequency bins with small spectral leakage compared to zero-padded or unpadded FFT based decompositions.

Each metric calculation functionality 120d-f can calculate a signal quality metric for the given timing hypothesis represented by each corresponding hypothesis block 1 to n. The signal quality metric can include, for example, a cyclic redundancy check (CRC), a channel quality indicator (CQI) that is predicated on a known signal structure, a signal to noise ratio (SNR) of a RS or a paging signal, a signal power, a signal to interference ration (SIR), a signal power spectral density, and the like. The output of each metric calculation functionality 120d-120f can be stored as a signal quality metric or score in the controller 130. The metric calculation functionality 120d-f may be performed in a signal quality measurement unit, such as metric calculator 178 as further discussed with respect to hardware implementation 150 of FIG. 1B. The signal quality measurement units may be described as a signal quality assessor. The order of evaluation of the signal quality metrics may be determined by a loop control signal from the controller 130. In this capacity, the controller 130 may act as a loop controller. For example, the controller 130 may arrange the order of evaluation in terms of probable priority, such as a prior probability determined by an application of Bayesian statistics.

The controller 130 can include a score memory 130a and a score selector 130b and can output a timing for when the paging indicator or control message arrived. The score memory 130a can include a random access memory (RAM), a first-in, first-out (FIFO) memory, and the like. The hypothesis testing unit 120 can overwrite the contents of the score memory 130a with hypothesis scores. The score memory 130a can transfer signal quality metrics or scores to the score selector 130b. In an embodiment, the hypothesis testing unit 120 can be configured to decode received messages and the decoded messages can be stored, for example, in a memory in controller 130.

The score selector 130b can process a set of scores corresponding to selected hypotheses from score memory 130a and can rank or prioritize each score relative to other scores. The score selector 130b can select and output the hypothesis or hypothesized time interval that corresponds to the highest score. The highest score can determine the timing of a designated timeslot or symbol timing of a paging signal. For example, the score selector 130b can select a hypothesized time-frequency bin that has a CQI score of 25 or more instead of time-frequency bins that have a CQI score of 15 or below. The score selector 130b may interpolate the time corresponding to a set of hypothesis scores. Interpolation can improve the effective time resolution of the symbol timing. The score selector 130b can include a central processing unit, a microprocessor, a programmable logic array, and the like that can compare scores and can generate control signals that control the sample selector unit 110 and the hypothesis testing unit 120.

The controller 130 can determine an approximate timing of a paging signal from a set of channel metrics or scores from hypothesis testing unit 120. In an embodiment, the controller 130 may, in addition to coarsely estimating the timing of the paging indicator, adjust the convergence rate of the channel estimation of the channel estimator 172 discussed with respect to FIG. 1B.

The controller 130 can determine the number of hypotheses to test and can configure hypothesis testing unit 120 accordingly. The number of hypotheses to test or the timing window for the paging signal can depend, for example, on the rate of clock drift of the wireless device 102 relative to a base station clock. A larger clock drift between paging events can increase the number of hypotheses. The controller 130 can adjust the number of hypotheses dynamically and can change the order in which the hypotheses are evaluated, sorted, ranked, and compared. For example, the controller 130 can evaluate the hypotheses in serial order. The controller 130 can minimize the pre-frame interval or wake-up time that precedes a designated time-slot in a paging signal by adjusting the hypothesis window, granularity, as well as the order of evaluation.

The disclosed devices and methods can eliminate the need to perform multi-path searching and can minimize the pre-frame or interval between a wake-up time and the actual arrival of a designated time-slot in the paging signal, thereby increasing the standby time of a wireless device relative to other wireless devices. For example, the wireless device 102 can exit a sleep mode, rapidly re-acquire an OFDMA paging indicator timing, test for message availability, and resume the sleep mode if no message is pending. The disclosed devices and methods can eliminate the multi-path searcher of conventional wireless devices, reduce the pre-frame interval in the current and subsequent instances of exiting the sleep mode, reduce battery drain, and increase the standby time.

The disclosed devices and methods can be used for voice over internet protocol (VoIP), 3GPP UEs, including LTE cellular technology, DRX cellular handsets, and other communications technologies and systems. As an example, emerging 3GPP standards call for an OFDM symbol set having a 65 is symbol duration. The timing error tolerance for each OFDM symbol can span approximately 4% of the symbol period, or 2.5 μs. The timing error tolerance for OFDM signals can be much larger than CDMA, TDMA and certain other signals. The number of timing hypotheses can be reduced accordingly.

The timing error tolerance can be much smaller than the probable timing error or window of uncertainty for the arrival of a paging signal, which can be about 20 μs. The uncertainty can be due to clock drift in a wireless device relative to a base station, for example. The paging signal arrival uncertainty can be much smaller than the average interval between paging signals, which can be about 5 milliseconds (ms), for example. For these example tolerances and uncertainties, the hypothesis testing unit 120 and controller 130 can use about eight (=20 μs/2.5 μs) timing hypotheses and can select a hypothesized time that is tolerably close to the true paging signal symbol timing. Subsequently, the controller 130 may exit a sleep mode and check the paging signal by a pre-frame interval approximately equal to 20 μs plus a power-up interval of approximately 2 milliseconds (ms) for analog, RF, automatic gain control (AGC), digital circuits, and other circuits.

When the controller 130 1) tests the multiple timing hypothesis, 2) extracts the channel coefficients, 3) demodulates the paging signal, and, optionally, 4) decodes the bit streams for each hypothesis, then the controller 130 can compute a trial CRC for each hypothesis. If a trial CRC matches the CRC embedded in a paging signal, then the CRC matched time delay hypothesis can be used for 1) subsequent demodulation of the RF signal, 2) improving or refining the channel coefficient estimates, and 3) locking to or tracking the arrival time or frame time of subsequent paging signals. As discussed with respect to hardware implementation 150 and message timing determination 100, hypothesis testing can be performed serially, i.e. one hypothesis after another, or sequentially.

Figure 2:
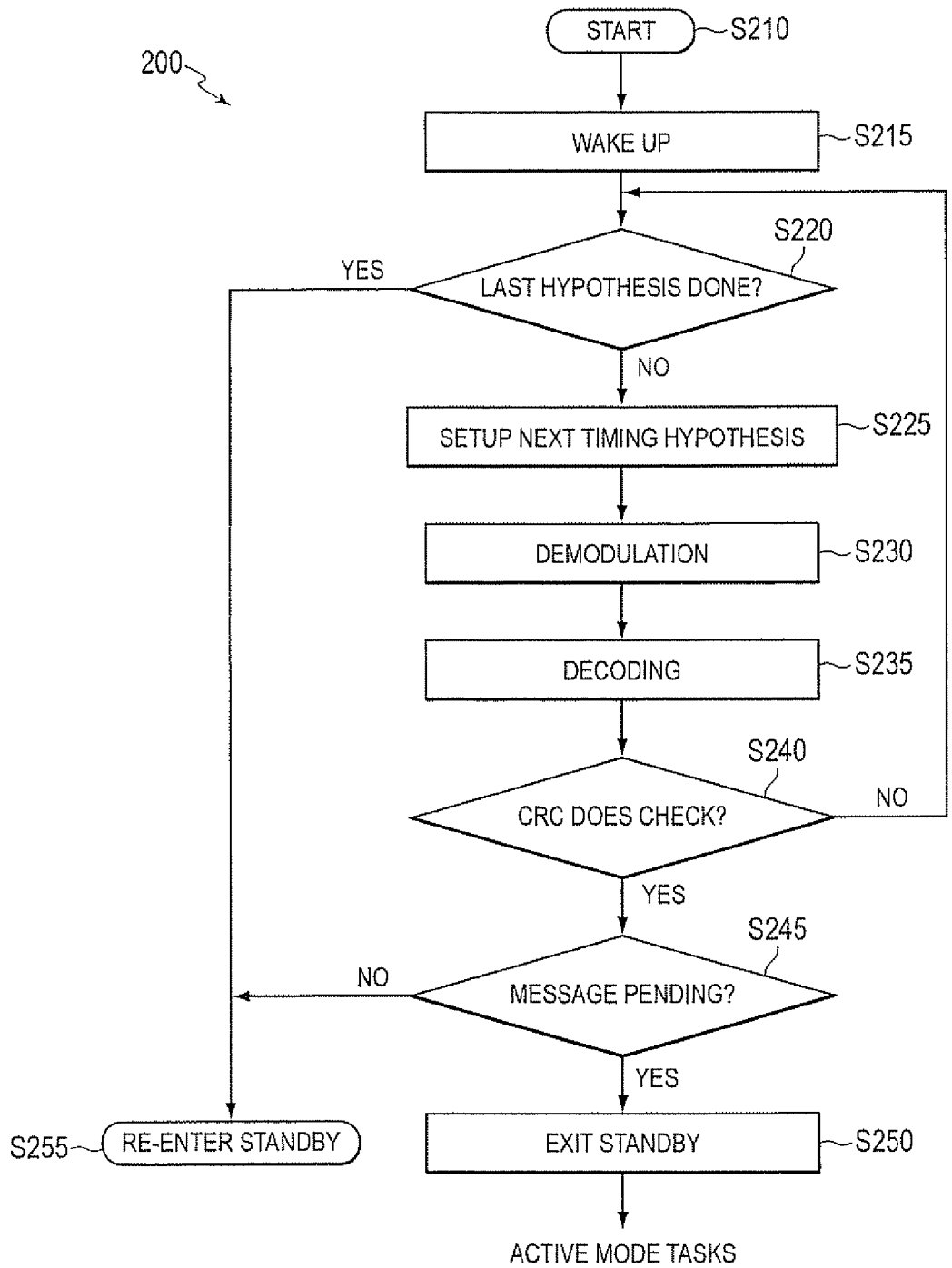
FIG. 2 shows a flowchart of a method for increasing the standby time of a wireless device in accordance with an embodiment.

FIG. 2 shows a flowchart of a method 200 for increasing the standby time of a wireless device in accordance with an embodiment. The program can begin at step S210 and can proceed to step S215 in which a wireless device, which is on standby, is awakened from a sleep mode. The wireless device may be awakened at a pre-frame interval or wake-up time that precedes a pre-defined time-slot for receipt of a paging indicator in idle mode or receipt of a control message on a control channel in a discontinuous reception mode of a connected state. Wakening the wireless device can include activating or powering analog, RF, and digital circuits, configuring a receiver, such as receiver front end 105, and the like.

Wakening the wireless device can include configuring a hypothesis testing unit, such as hypothesis testing unit 120 with a hypothesis window, a hypothesis time resolution or granularity, the number of timing hypotheses to be tested, the order or priority for evaluating hypotheses, initializing a hypothesis counter, and the like. For example, wakening the wireless device can include setting a time granularity of 2.5 μs, setting the total number of hypotheses to eight, setting a hypothesis window of 25 μs, and selecting a chronological order of evaluation.

From program step S215, the program can flow to program step S220 in which a count of the hypotheses that have been tested can be compared with the total number of hypotheses. For example, there may be eight hypotheses or eight hypothetical paging signal symbol timings to evaluate. If the comparison indicates that the last hypothesis has already been tested, then program flow can proceed from step S220 to step S255 in which the wireless device can resume a sleep mode of standby. If the comparison in step S220 indicates that an additional hypothesis needs to be tested, then program flow can proceed to step S225. For example, if seven out of eight hypotheses have been tested, then program flow can proceed from step S220 to step S225.

In program step S225, the program can prepare to test the next or current timing hypothesis. The preparation can include, for example, selecting a subset of signal samples, setting up an FFT or other suitable demodulation such as an orthogonalizing transform, initializing memory locations, incrementing a hypothesis counter, and the like. A sample selector unit, such as sample selector unit 110, can select and supply the subsets of signal samples to multiple demodulators, as directed in step S225.

From program step S225, program flow can continue to program step S230 in which the paging signal can be demodulated. For example, the paging signal can be demodulated by decomposing the paging signal into different frequency components, equalizing and recombining the components. Demodulating the signal can include separating orthogonal signal components from each other and from other components such as noise, common channel signals, and interference. For example, FFT calculations can place the results in FFT frequency bins that correspond to a frequency grid. Some portions of the other components may be included in FFT bins that would otherwise only contain the orthogonal signal components. In other words, the separation of signal and noise may be incomplete.

From program step S230, program flow can proceed to program step S235 in which the demodulated signal can be decoded to extract a symbol stream, bit stream, or data stream. Decoding can include extracting information and parity bits from a combined information and parity bit stream, decoding an estimated CRC, decoding a forward error corrected (FEC) encoded signal, and the like.

From program step S235, program flow can proceed to program step S240 in which an estimated or candidate CRC of the decoded information and parity bits can be checked versus an embedded CRC from the demodulated, decoded paging signal. The estimated CRC can be based on demodulation and decoding of the signal samples using the current timing hypothesis as described with respect to program steps S230 and S235. If the estimated CRC does not match the embedded CRC, then the CRC mismatch can cause the program flow to return to step S220, otherwise program flow can proceed to step S245.

When the program flow arrives at step S245, that is, when and if the detected and embedded CRCs match, then the program can test for a pending message. If no message is pending, program flow can proceed to step S255 and re-enter the standby mode, otherwise the program flow can proceed to program step S250, exit the standby mode, and enter a connect mode. In other words, from program step S250, the program can proceed to active mode tasks.

Flowchart 200 may be part of an interrupt-driven program, for example. A clock, such as a system clock, can activate the interrupt-driven program. The program step S250 can, when exiting standby mode, adjust the clock so that the receiver is awakened or pre-triggered in a subsequent step S215 just before the arrival of a next paging signal. The time interval between the pre-trigger or wake-up time and the start of a designated time-slot in the paging signal can be called the pre-frame interval.

The wake-up time can vary due to the drift of a time base or clock in a wireless device relative to the time-of-arrival (TOA) of a repeated paging signal. The paging signal may or may not be strictly periodic. The wake-up time may be determined from an extended Kalman tracker, a Bayesian tracker, a gated phase locked loop, and the like. Program step S255 can modify a wake-up time that closely precedes the next paging signal. For example, both steps S250 and 255 can adjust the wake-up time to precede a designated symbol in the next paging signal frame by an interval that is approximately equal to the paging window uncertainty. For example, the paging window uncertainty due to drift in a wireless device clock relative to a base station clock can be 20 microseconds (µs).

Figure 3:
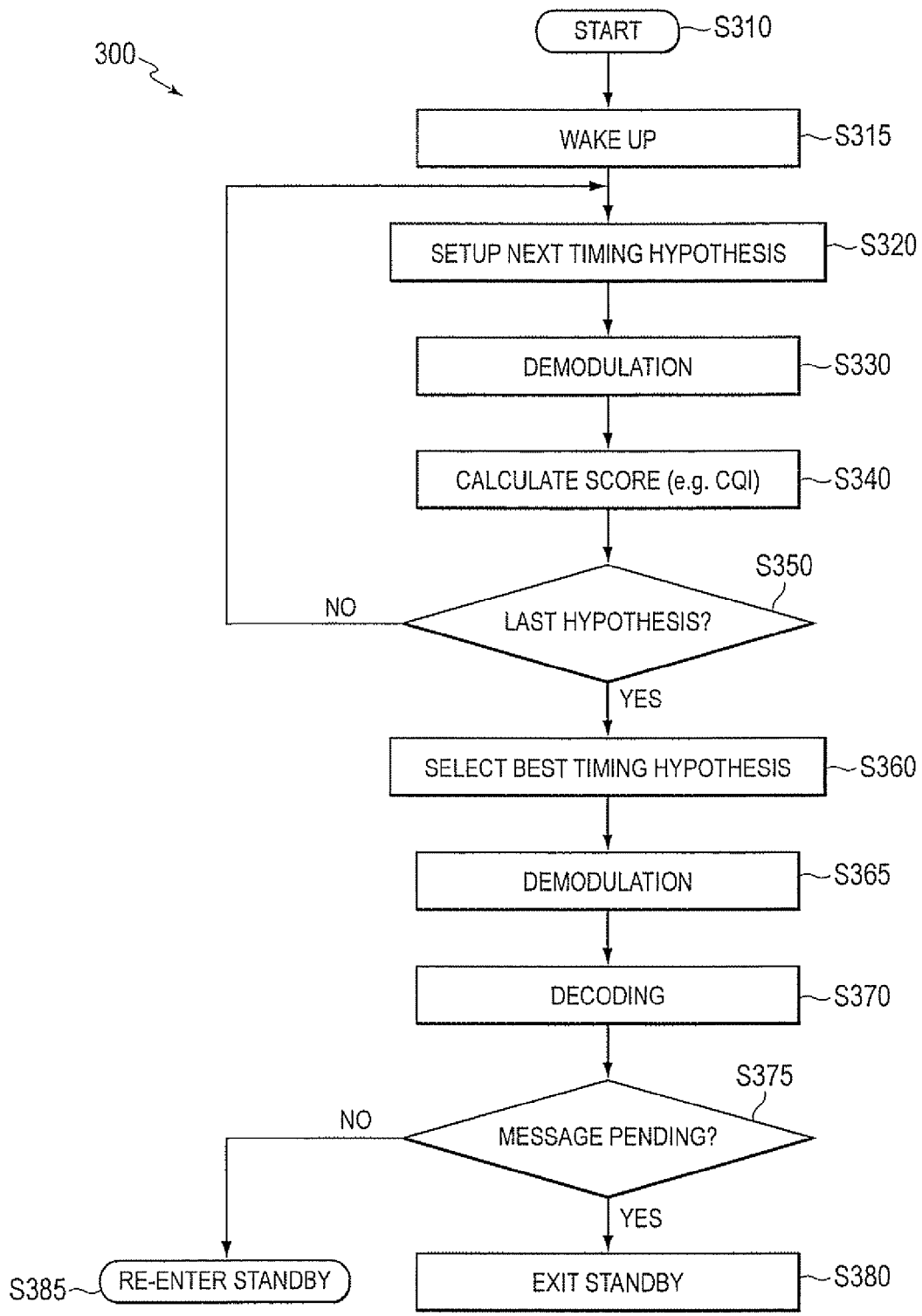
FIG. 3 shows a flowchart of a method for increasing the standby time of a wireless device in accordance with an embodiment.

FIG. 3 shows a flowchart of a method 300 for increasing the standby time of a wireless device in accordance with an embodiment. The program can start at step S310 and can proceed to step S315 in which the wireless device can be awakened as discussed with respect to program step S215.

From program step S315, the program can flow to step S320 in which the program can prepare to estimate next or current timing hypothesis. The program step S320 can include sub-steps such as selecting a subset of data samples, initializing demodulation functionality, initializing a hypothesis counter, and the like.

From program step S320, program flow can proceed to step S330 in which demodulation of the signal can occur as discussed with respect to program step S230.

From program step S330, program flow can proceed to step S340 in which a signal-structure dependent signal quality metric may be calculated. The signal quality metric calculation may or may not be based on decoding a bit stream from the signal. For example, the CQI can be calculated based on a known or pre-determined signal structure without decoding a bit stream.

Program step S340 can include sub-steps for signal quality metric calculations, such as SNR calculations, signal to interference ratio (SIR) calculations, CQI calculations, and the like. Step S330 may include parameter extraction routines that can determine channel coefficients that can equalize subsequent signal demodulation.

From program step S340, program flow can proceed to step S350 in which a count of the number of hypotheses tested can be compared with the maximum or total number of hypotheses. If all hypotheses have been tested, program flow can proceed to step S360, otherwise program flow can proceed to back to step S320.

The best timing hypothesis can be selected in program step S360. The timing hypothesis selection can be based on one or more signal quality metrics, such as CQI, SNR, SIR, and the like. For example, the best timing hypothesis may be determined from a single hypothesis with the largest CQI or may be an interpolated or an extrapolated value from multiple hypotheses. In other words, the best timing hypothesis can be a single hypothesis selected using the maximum of the calculated signal quality metric, an interpolated value from multiple hypothesized times of arrival. The best timing hypothesis can be determined from the hypotheses using a maximum likelihood (ML) ratio or log likelihood ratio based estimate, a Bayesian estimate, and the like.

From program step S360, program flow can proceed to program step S365 in which demodulation of the signal using the best timing hypothesis may be performed. The demodulation steps in program step S365 can match the demodulation steps of program step S330, but with channel coefficients that are statistically conditioned on use of the best timing hypothesis. In other words, a set of channel coefficients can be associated with each timing hypothesis. The channel coefficients can fine-tune or equalize the demodulation to improve the quality of an IF or base band signal. The demodulation step can include selecting or averaging channel coefficients from each hypothesis to obtain an improved set of channel coefficient for the next awakening from the sleep mode. The improved coefficients may be realized by using an adaptive filter, a gradient search, a Kalman filter, a maximum likelihood sequence estimator or Viterbi decoder, and the like.

From program step S365, program flow can proceed to program step S370 in which the demodulated signal for the selected hypothesis can be decoded to extract information bits and parity bits from an encoded data stream. Decoding the bit stream can include detecting, discriminating, hard limiting, decision thresholding, and the like, of the demodulated signal. For example, the decoded bit stream may be obtained using a CRC, a forward error correction code, a repetition code, and the like to detect and connect bit errors.

From program step S370, program flow can proceed to program step S375 in which a test or check for pending messages from a base station may be performed. The pending message test can include examining the decoded data to determine if the base station has a message for the cellular handset. If a message is pending, program flow can proceed to program step S380 in which the standby mode is exited and an active or connect mode is entered, otherwise program flow can proceed to program step S385 in which a sleep mode of standby can be resumed.

Both program steps S380 and S385 can include sub-steps in which an alarm pre-trigger time or pre-frame interval hypothesis window size, and a hypothesis timing granularity can be evaluated or re-evaluated. The wake-up time or pre-trigger time calculated in program step S380 and/or program step S385 can establish a wake-up or pre-trigger time that precedes the likely arrival of a next paging signal from the base station.

Figure 4:
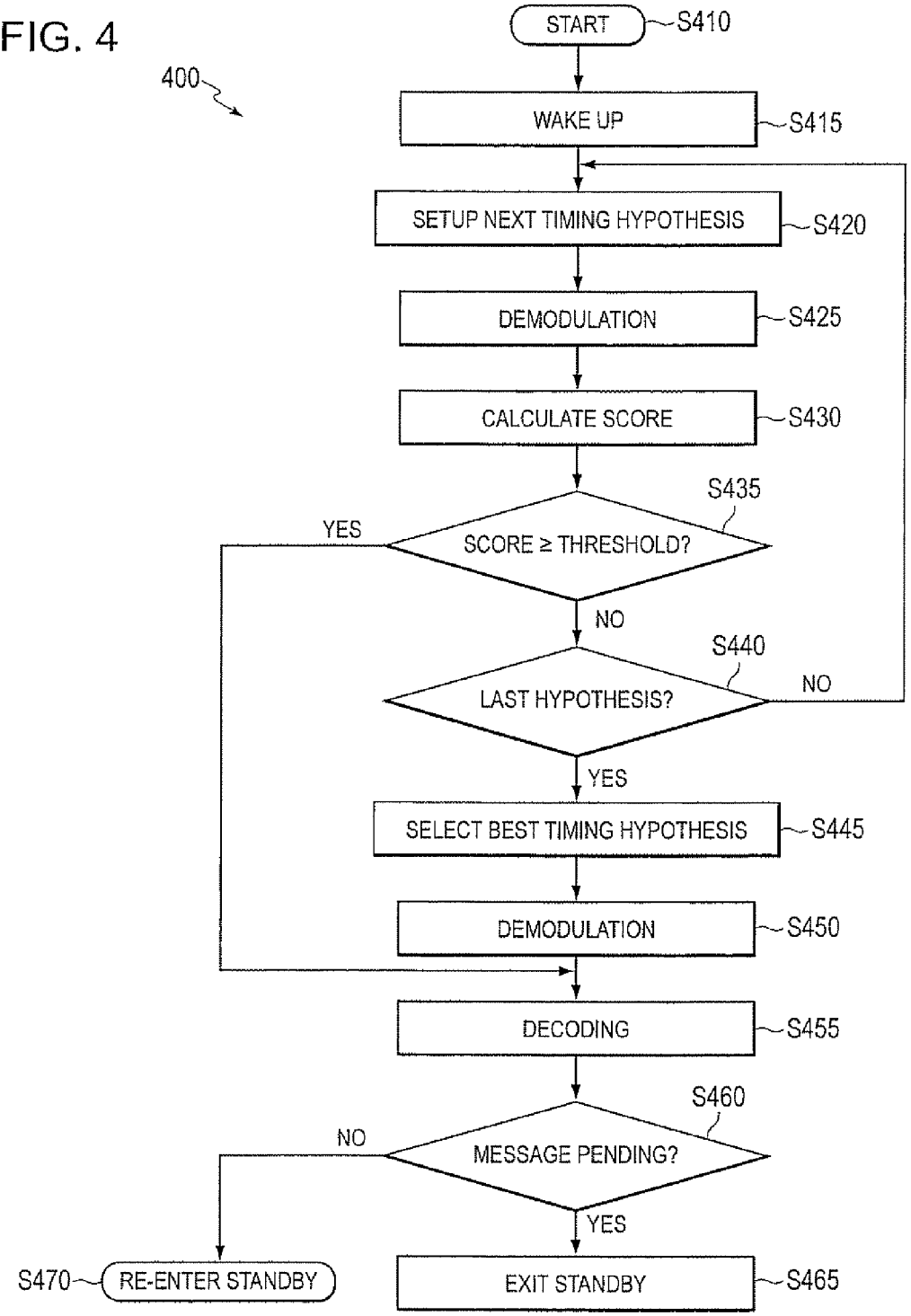
FIG. 4 shows a flowchart of a method for increasing the standby time of a wireless device in accordance with an embodiment.

FIG. 4 shows a flowchart of a method 400 that can increase the standby time of a wireless device in accordance with an embodiment. The program can start at program step S410 and can proceed to program step S415. In program step S415, the receiver or cellular handset can be awakened as discussed with respect to program step S215.

From program step S415, program flow can proceed to program step S420 in which preparations for testing a given timing hypothesis can be made. The given timing hypothesis can quantify an a priori estimate of a paging signal time-of arrival (TOA) relative to a clock in the wireless device. Each given timing hypothesis can differ from other hypotheses by an integer multiple of a time granularity. The program can evaluate an a posteriori or Bayesian estimate of the true TOA of the paging signal by demodulating the RF signal and calculating a signal metric for each hypothesis as described with respect to steps S425 and S430.

From program step S420, program flow can proceed to program step S425 in which demodulation, including channel estimation and/or equalization, can be performed. A demodulator, such as an demodulator functionality 120a-120c, can separate the components of signal and noise in a paging signal. For example, an FFT and channel estimation may demodulate the reference signal or the paging indicator signal. The reference signal can be demodulated independently of the paging indicator signal. Demodulation of the reference signal or the paging indicator signal can prepare program step S430 to calculate a score based on the reference signal CQI and the paging indicator signal SNR, respectively.

Demodulation of the paging indicator signal, such as with an FFT and channel estimation, may take into account the transmit signal structure. For example, the transmit signal may include space frequency block code (SFBC) properties that may be used to demodulate the paging indicator channel. For example, the paging signal may include orthogonal signal components, such as OFDMA signal elements, that fall within a prescribed set of FFT time-frequency bins.

The program step S425 can include single or multi-variate parameter estimation subroutines that can determine, for example, a center frequency of an FFT bin, a Doppler shift, a real or complex multi-path interference path loss, other signal parameters and channel coefficients. The channel coefficients can be used for equalization, demodulation, and decoding aspects of a paging signal.

From program step S425, program flow can proceed to program step S430 in which a signal quality metric or score, such as a CQI, can be calculated. The signal quality score can include a SNR, a SIR, a CQI, a signal power level, and the like. The signal quality metric can be based on a combination of SNR, SIR, CQI, and the like. The signal quality metric can qualify the suitability of a current timing hypothesis for use in demodulating the signal in a subsequent step.

From program step S430, program flow can proceed to program step S435 in which the calculated signal guide by score can be compared to a threshold score. For example, a CQI of 20 can be compared with a threshold CQI of 25. If the calculated score equals or exceeds the threshold, program flow can proceed to program step S455, otherwise program flow can proceed to program step S440.

In program step S440, a count or index of given hypotheses under evaluation can be compared against the maximum or total number of hypotheses. If the current hypothesis index equals or exceeds the total number of hypotheses, then program flow can proceed to program step S445, otherwise program flow can proceed to program step S420.

In program step S445, the best timing hypothesis can be selected and used to process the paging signal. For example, the selected or best timing hypothesis can be selected based on the largest score. The best timing hypothesis may include weighted combinations from hypotheses with sub-threshold scores. The signal quality metric and the timing and channel parameters that apply to the best timing hypothesis can be extracted from a memory, such as score memory 130a.

From program step S445, program flow can proceed to program step S450 in which the paging signal can be demodulated using best timing hypothesis and associated channel coefficients. For example, the paging signal can be demodulated using an FFT, a discrete Fourier transform (DFT), a chirp-Z transform, and the like. Program steps S445 and S450 can correspond to program steps S420 and S425, respectively, but use a posteriori estimates of paging signal TOA and channel coefficients.

From program step S450, program flow can proceed to program step S455 in which the demodulated signal can be decoded. The decoding process can include bit detection, hard limiting, discrimination, quantization, sequence estimation, and the like. For example, the decoding process can include applying a CRC decoder, a forward error correction (FEC) decoder, a ML decoder, a Viterbi decoder, a turbo decoder, and the like.

From program step S455, program flow can proceed to program step S460 in which the availability of a message from a base station can be evaluated. The base station can indicate to the wireless device that a message or downlink communication is available. If a message is available, program flow can proceed from step S460 to program step S465 and the standby mode can be exited. Otherwise, program flow can proceed to program step S470 in which the standby mode can be resumed.

In both program steps S465 and S470, the program can calculate and store parameters used for subsequent wake-up operations in step S415. For example, S465 and S470 can include sub-steps that determine a next timing window width, a pre-trigger time that precedes the TOA of a next paging signal, a timing hypothesis granularity, and the like.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A wireless user equipment device that receives a communication signal transmitted along a wireless channel, comprising:
   a sleep deactivator that periodically activates a wireless user equipment from a sleep mode at a wake-up time in advance of a time slot during which a message that is expected to be received;
   an extractive element, coupled to the sleep deactivator, that extracts the message in at least one of a plurality of intervals of the time slot;
   a signal quality assessor, coupled to the extractive element, that is configured to assess a quality of the message at at least one of the plurality of intervals and assign a quality metric score for each one of the plurality of intervals at which an assessment is made; and
   a message timing estimator, coupled to the signal quality assessor, that is configured to determine a message timing of the message based on a set of the assigned quality metric scores.

2. The wireless user equipment device of claim 1, wherein the extractive element is a demodulator.

3. The wireless user equipment device of claim 2, wherein the message includes at least one OFDM symbol arranged as encoded bits.

4. The wireless user equipment device of claim 3, wherein the demodulator extracts the encoded bits.

5. The wireless user equipment device of claim 4, wherein the demodulator includes at least one of a fast Fourier transform (FFT), a channel estimator, and an equalizer.

6. The wireless user equipment device of claim 1, further comprising:
   a decoder that decodes the encoded bits at one or more of the intervals.

7. The wireless user equipment device of claim 1, wherein the signal quality assessor is further configured to assesses the quality of the message at all of the intervals and to assign the quality metric for each interval.

8. The wireless user equipment device of claim 1, wherein the communication signal is an orthogonal frequency division multiple access (OFDM) signal having an OFDM symbol and a cyclic prefix.

9. The wireless user equipment device of claim 8, wherein the extractive element is further configured to receive additional OFDM symbols based on the message timing.

10. The wireless user equipment device of claim 1, wherein the signal quality assessor further comprises:

a plurality of signal quality measurement units that are configured to assess the quality of the message, each signal quality measurement unit corresponding to an interval.

11. The wireless user equipment device of claim 1, further comprising:
a loop controller that is configured to specify at least one of the plurality of intervals in an order of assessment; and
a signal quality measurement unit that is configured to assess the quality of the message in the specified interval.

12. The wireless user equipment device of claim 11, wherein the quality metric is stored in a memory and the message timing estimator is further configured to determine a message timing based on the interval that corresponds to a best quality metric.

13. The wireless user equipment device of claim 12, wherein the best quality metric is at least one of a CRC match, an energy centroid, a channel quality indicator, a signal to noise ratio, and a maximum likelihood.

14. The wireless user equipment device of claim 12, wherein the message timing estimator is further configured to evaluate the quality metric in an order of arrival and determine the message timing based on the interval that corresponds to the quality metric that exceeds a predetermined threshold.

15. The wireless user equipment device of claim 12, wherein the sleep deactivator is further configured to place the wireless user equipment device in sleep mode after the message timing is determined and no message at an eNodeB is waiting to be transmitted to the wireless user equipment.

16. The wireless user equipment device of claim 1, wherein the message timing estimator is further configured to determine an optimum signal demodulation timing based on a plurality of timing hypothesis tests.

17. The wireless user equipment device of claim 16, wherein the quality metric includes at least one of at least one of a CQI, an SNR, and an SIR.

18. A wireless device, comprising:
a sleep deactivator that periodically activates a wireless user equipment from a sleep mode at a wake-up time in advance of a time slot during which a periodic message that is expected to be received;
a receiver configured to receive and sample a transmitter signal that includes the periodic message;
a sample selector unit configured to delay the sampled received signal at a plurality of delays and form a corresponding plurality of delayed sampled received signals;
an extractive element, coupled to the sleep deactivator, that extracts the periodic message in at least one of a plurality of intervals of the time slot;
a hypothesis testing unit, coupled to the extractive element, that is configured to assess a quality of the periodic message at at least one of the plurality of intervals and assign a quality score for each one of the plurality of intervals at which an assessment is made; and
a controller of the delayed sampled received signal configured to determine a message timing corresponding to one of the quality scores.

19. The wireless device of claim 18, wherein the periodic message is at least one of a paging indicator in a paging channel and a control message on a DRX connected mode control channel in a DRX connected mode.

20. The wireless device of claim 18, wherein the receiver is further configured to receive a subsequent transmission based on the periodic message.

21. The wireless device of claim 18, wherein the controller uses the message timing to determine if the wireless device is being paged, and, if so, causes the wireless device to exit a standby mode.

22. The wireless device of claim 21, wherein the receiver is further configured to receive a subsequent transmission based on the periodic message.

23. The wireless device of claim 21, wherein the periodic message further comprises a designated symbol in a predefined time-slot in a paging channel.

24. The wireless device of claim 23, wherein the periodic message is at least one of a E-UTRA paging indicator (PI), a 3GPP LTE paging indicator, a 3GPP LTE reference signal (RS) and a control message in a DRX connected mode.

25. The wireless device of claim 23, wherein the periodic message includes a cyclic redundancy code (CRC) and the predetermined criterion is at least one of a CRC match, an energy centroid, a channel quality indicator, a signal to noise ratio, and a maximum likelihood.

26. The wireless device of claim 18, further comprising:
a sequencer, coupled to the hypothesis testing unit, that is configured to score the delayed sampled received signals sequentially in order of delay.

27. The wireless device of claim 18, further comprising:
a comparator, coupled to the hypothesis testing unit, that is configured to compare the quality scores with a threshold and determine the message timing based on a first quality score that exceeds the threshold.

28. The wireless device of claim 18, wherein each of the delayed sampled received signals abuts at least one other of the delayed sampled received signals.

29. The wireless device of claim 21, wherein the plurality of delays differ by between one twenty sixth ($\frac{1}{26}$) and one half ($\frac{1}{2}$) of a designated symbol duration.

30. The wireless device of claim 29, wherein the wireless device exits a standby mode of at least one of a 3GPP WiMax and a 3GPP long term evolution (LTE) standard.

31. The wireless device of claim 18, wherein the hypothesis testing unit further comprises:
a demodulator that is configured to demodulate the transmitter signal based on an orthogonalizing transformation.

32. The wireless device of claim 31, wherein the orthogonalizing transformation is a fast Fourier transformation and an equalization.

33. The wireless device of claim 18, wherein the hypothesis testing unit further comprises a plurality of hypothesis units, each hypothesis unit including:
a fast Fourier transform unit that is configured to compute a fast Fourier transform of at least one of the delayed sampled received signals; and
a metric calculation functionality, coupled to the fast Fourier transform unit, that is configured to calculate the quality score of the at least one of the delayed sampled received signals.

34. The wireless device of claim 18, wherein the controller further comprises:
a score selector that is configured to arrange the scores in an order of probable priority, compare the prioritized scores with a threshold, select a first score that exceeds the threshold, and determine the message timing based on the first score.

35. The wireless device of claim 18, wherein the delayed sampled received signals are contiguous in time.

36. The wireless device of claim 18, wherein the transmitter signal is an orthogonal frequency division multiple access (OFDMA) signal.

37. A wireless device, comprising:
  a sleep deactivator that periodically activates a wireless user equipment from a sleep mode at a wake-up time in advance of a time slot during which a paging indicator that is expected to be received;
  a receiver that is configured to sample a transmitter signal that includes the paging indicator;
  a sample selector unit that is configured to distribute offset groups of samples of the received indicator to a hypothesis testing unit;
  an extractive element, coupled to the sleep deactivator, that extracts the paging indicator in at least one of a plurality of intervals of the time slot;
  the hypothesis testing unit, coupled to the extractive element, that is configured to assess a quality of the paging indicator at at least one of the plurality of intervals and assign a present score for each one of the plurality of intervals at which an assessment is made; and
  a controller that is configured to determine a message timing corresponding to one of the present scores and determine a next message timing based on the present message timing.

38. The wireless device of claim 37, wherein the controller is further configured to determine a next wake-up time based on the present scores.

39. The wireless device of claim 37, wherein the controller is further configured to determine the next message timing based on both the present score and a next score.

40. A method of determining periodic message timing in a wireless device, comprising:
  activating periodically the wireless device from a sleep mode at a wake-up time in advance of a time slot during which a periodic signal that is expected to be received;
  sampling a received transmitter signal that includes the periodic signal that is transmitted in predetermined slots of time and has plural frequency components;
  generating offset groups of received signal samples;
  extracting the periodic signal in at least one of a plurality of intervals of the time slot;
  demodulating the offset groups of received signal samples;
  assessing a quality of the periodic signal at at least one of the plurality of intervals and assign a score for each one of the plurality of intervals at which an assessment is made;
  scoring selected offset groups based on a predetermined criterion; and
  selecting a message timing corresponding to a score of the selected offset groups.

41. The method of claim 40, further comprising:
  using the message timing to determine if the wireless device is being paged, and, if so, causing the wireless device to exit a standby mode.

42. The method of claim 41, wherein the periodic signal includes a designated indicator in a pre-defined time-slot in a paging channel.

43. The method of claim 42, wherein a wake-up time precedes the designated indicator.

44. The method of claim 42, wherein the paging signal is at least one of a 3GPP LTE paging indicator (PI), a E-UTRA PI, a 3GPP LTE reference signal (RS), and a E-UTRA RS.

45. The method of claim 42, wherein the indicator includes a cyclic redundancy code (CRC) and the predetermined criterion is at least one of a CRC match, an energy centroid, a channel quality indicator, a signal to noise ratio, and a maximum likelihood.

46. The method claim 40, further comprising:
  scoring the offset groups of received signal samples in an order of increasing delay.

47. The method of claim 40, further comprising:
  comparing the scores with a threshold and determining the message timing based on a first score that exceeds the threshold.

48. The method of claim 40 wherein the periodic message is received at a plurality of frequencies in an OFDM signal.

49. The wireless user equipment device of claim 1, wherein the message timing estimator determines the message timing by interpolating times corresponding to the set of the assigned quality metric scores.

* * * * *